US010479335B2

(12) United States Patent
Kuhlman et al.

(10) Patent No.: US 10,479,335 B2
(45) Date of Patent: Nov. 19, 2019

(54) VEHICLE BRAKING SYSTEM WITH ABS EMULATION

(71) Applicant: Robert Bosch GmbH, Stuttgart (DE)

(72) Inventors: Ryan Kuhlman, Novi, MI (US); Simon Hansmann, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 119 days.

(21) Appl. No.: 15/852,107

(22) Filed: Dec. 22, 2017

(65) Prior Publication Data

US 2019/0193700 A1    Jun. 27, 2019

(51) Int. Cl.
| | |
|---|---|
| *B60T 8/40* | (2006.01) |
| *B60T 13/16* | (2006.01) |
| *B60T 13/68* | (2006.01) |
| *B60T 7/04* | (2006.01) |
| *B60T 8/1761* | (2006.01) |
| *B60T 13/66* | (2006.01) |

(52) U.S. Cl.
CPC ............ *B60T 8/4081* (2013.01); *B60T 7/042* (2013.01); *B60T 8/1761* (2013.01); *B60T 8/4068* (2013.01); *B60T 13/166* (2013.01); *B60T 13/662* (2013.01); *B60T 13/686* (2013.01); *B60T 2220/04* (2013.01); *B60T 2270/82* (2013.01)

(58) Field of Classification Search
CPC .... B60T 8/4081; B60T 8/1761; B60T 8/4068; B60T 7/042; B60T 13/166; B60T 16/662; B60T 13/686; B60T 2220/04; B60T 2270/82

See application file for complete search history.

(56) References Cited

U.S. PATENT DOCUMENTS

| | | | | |
|---|---|---|---|---|
| 4,776,643 A | * | 10/1988 | Leiber | B60T 7/042 |
| | | | | 303/113.4 |
| 4,861,118 A | * | 8/1989 | Burckhardt | B60T 8/40 |
| | | | | 303/113.2 |
| 5,586,814 A | * | 12/1996 | Steiner | B60T 8/268 |
| | | | | 303/113.1 |

(Continued)

FOREIGN PATENT DOCUMENTS

| | | | |
|---|---|---|---|
| DE | 10262003 A1 | 3/2004 | |
| DE | 102006026873 A1 * | 12/2007 | B60T 7/042 |

*Primary Examiner* — Thomas W Irvin
(74) *Attorney, Agent, or Firm* — Michael Best & Friedrich LLP (57) ABSTRACT

A vehicle braking system includes a wheel cylinder, a brake pedal, a master cylinder, a master cylinder circuit, a primary braking unit operable to generate a braking force at the wheel cylinder in a primary mode, decoupled from the master cylinder circuit, a secondary braking unit including a second electrically-actuated pressure generating unit and operable to generate a braking force at the wheel cylinder in a secondary mode of operation, a plurality of valves configured to provide anti-lock braking at the wheel cylinder upon loss of traction during braking in the primary mode of operation, and a controller programmed to actuate the plurality of valves and further programmed to actuate the second electrically-actuated pressure generating unit upon loss of traction in the primary mode of operation to generate pulsations within the master cylinder circuit to provide a feedback force at the brake pedal indicative of the anti-lock braking.

20 Claims, 4 Drawing Sheets

(56) References Cited

U.S. PATENT DOCUMENTS

| | | |
|---|---|---|
| 9,415,758 B2 * | 8/2016 | Drumm .................. B60T 17/22 |
| 9,561,787 B2 | 2/2017 | Quirant et al. |
| 2006/0186733 A1 | 8/2006 | Drumm |
| 2011/0024242 A1 | 2/2011 | Yang et al. |
| 2015/0061854 A1 * | 3/2015 | Drumm .................. B60T 7/042 |
| | | 340/453 |
| 2015/0197229 A1 | 7/2015 | Knechtges et al. |
| 2016/0221553 A1 | 8/2016 | Watanabe |
| 2017/0225664 A1 * | 8/2017 | Beever .................... B60T 7/042 |
| 2019/0193701 A1 * | 6/2019 | Kuhlman ................ B60T 8/409 |

* cited by examiner

VEHICLE BRAKING SYSTEM WITH ABS EMULATION

BACKGROUND

The present disclosure relates to vehicle braking systems. In particular, the invention relates to a vehicle braking system including a primary braking unit and a secondary braking unit.

SUMMARY

In one aspect, a vehicle braking system includes a wheel cylinder, a brake pedal, a master cylinder configured to receive an input from the brake pedal, a master cylinder circuit connected to the master cylinder, a primary braking unit, and a secondary braking unit. The primary braking unit includes a first electrically-actuated pressure generating unit distinct from the master cylinder and operable to generate a braking force at the wheel cylinder in a primary mode of operation, decoupled from the master cylinder circuit. The secondary braking unit includes a second electrically-actuated pressure generating unit distinct from the master cylinder and operable to generate a braking force at the wheel cylinder in a secondary mode of operation, a plurality of valves configured to transition between open and closed positions to provide anti-lock braking at the wheel cylinder upon loss of traction during braking in the primary mode of operation, and a controller programmed to actuate the plurality of valves and further programmed to actuate the second electrically-actuated pressure generating unit upon loss of traction in the primary mode of operation to generate pulsations within the master cylinder circuit to provide a feedback force at the brake pedal indicative of the anti-lock braking.

In another aspect, a method of providing anti-lock braking in a vehicle braking system includes electrically actuating a brake-by-wire braking unit to generate a braking force at a wheel cylinder, modulating a valve with a controller to introduce pressure pulsations into the braking force at the wheel cylinder, defining an anti-lock braking force, and electrically actuating a secondary braking unit, separate from the brake-by-wire braking unit, to generate a feedback force at a brake pedal while a master cylinder is decoupled from the wheel cylinder, the feedback force separate from the anti-lock braking force and provided in response to the introduction of pressure pulsations at the wheel cylinder.

In yet another aspect, a vehicle braking system includes a wheel cylinder, a brake pedal configured to receive a user input, a master cylinder configured to receive an input from the brake pedal, and a motor-driven pump operable to selectively provide fluid pressure to generate a feedback force to the brake pedal in a first braking mode in which the motor-driven pump is decoupled from the wheel cylinder, wherein the motor-driven pump is operable to generate a braking force at the wheel cylinder in a second braking mode.

DETAILED DESCRIPTION

Figure 1:
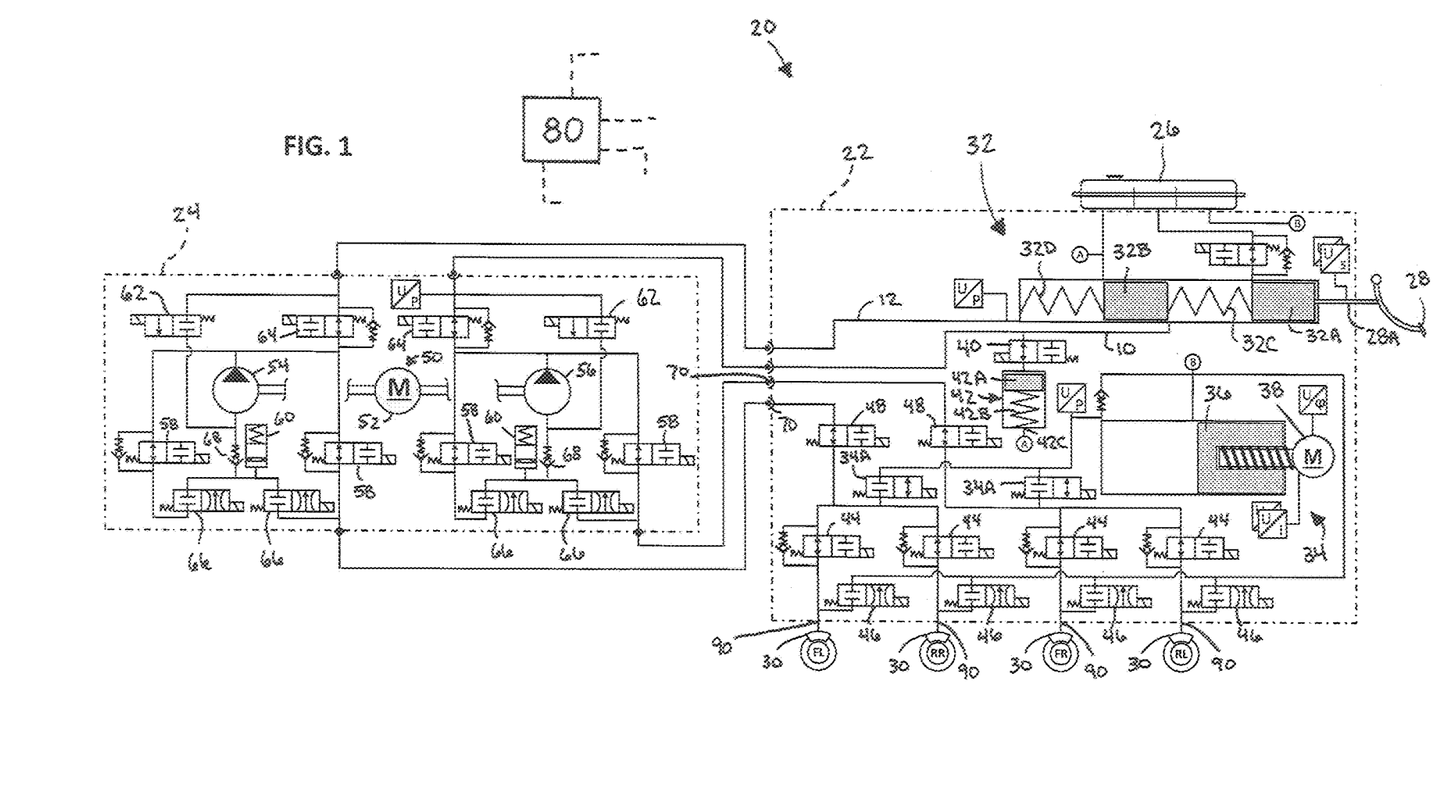
FIG. 1 is a schematic view of a vehicle braking system including a primary braking unit and a secondary braking unit.

FIG. 1 illustrates a vehicle braking system 20. The vehicle braking system 20 is a two-box braking system including a primary braking unit 22, a secondary braking unit 24, a fluid reservoir 26, a brake pedal 28, and a plurality of wheel cylinders 30 (as shown, the vehicle braking system includes four wheel cylinders 30) connected to the primary braking unit 22 at a plurality of outlet ports 90. The primary braking unit 22 is a single unit including inlet/outlet ports (e.g., ports 70, 90) for connection to, for example, the secondary braking unit 24, the wheel cylinders 30, and the reservoir 16. The primary braking unit 22 includes a master cylinder 32 in a direct relationship with the brake pedal 28 via an input rod 28A such that there is no brake booster between the master cylinder 32 and the brake pedal 28. Therefore, the brake pedal 28 actuates the master cylinder 32 directly through the input rod 28A. The master cylinder 32 is a tandem master cylinder with two master cylinder pistons 32A, 32B biased to unactuated positions by respective master cylinder springs 32C, 32D. The vehicle braking system 20 further includes two separate braking circuits 10, 12. Each braking circuit 10, 12 extends from a chamber associated with one of the master cylinder pistons 32A, 32B, through the primary braking unit 22, into and through the secondary braking unit 24, returning to the primary braking unit 22 via one of the return ports 70 of the primary braking unit 22, and to two of the four wheel cylinders 30.

The primary braking unit 22 further includes an electronically controlled pressure generating unit 34 operable to apply a braking force from the primary braking unit 22 to the wheel cylinders 30 in a brake-by-wire mode of operation. As shown, the electronically controlled pressure generating unit 34 is a plunger 36 driven by an electric motor 38 to pressurize the primary braking unit 22 and the wheel cylinders 30. Control valves 34A are configured to transition between an open position and a closed position and are operable to selectively separate the outlet of the plunger 36 from the wheel cylinders 30 in the closed position. The master cylinder 32 and electronically controlled pressure generating unit 34 are two fluid pressure suppliers. The vehicle braking system 20 includes a third fluid pressure supplier, motor-driven pumps, which will be explained in greater detail below.

The primary braking unit 22 further includes a pedal feel simulator 42. The simulator 42 is in selective communication with the master cylinder 32 to relay feedback to the brake pedal 28 proportional to the force supplied by the user to the brake pedal 28. The pedal feel simulator 42 includes a passive spring-biased plunger 42A that is biased to a first position via a spring 42B. In response to actuation of the master cylinder 32, the spring-biased plunger 42A is translated against the spring 42B, compressing the spring 42B at a rate based on a fixed characteristic, (i.e., the spring constant of the spring 42B). The simulator 42 further includes an outlet 42C on the rear side of the plunger 42A. The outlet 42C is in direct communication with the reservoir 26 to provide reservoir pressure behind the plunger 42A and an escape route for displaced fluid. A simulator valve 40 is located upstream of the simulator 42 (i.e., between the master cylinder 32 and the simulator 42). The simulator valve 40 is a normally-closed switching valve and is configured to switch between an open position and a closed position to selectively permit a fluid passageway between the master cylinder 32 and the pedal feel simulator 42.

The primary braking unit 22 further includes a plurality of valves, specifically: separation valves 48, inlet valves 44 and outlet valves 46. The braking unit 22 includes a single separation valve 48 for each circuit 10, 12. The separation valves 48 separate the wheel cylinders 30 and the first electronically controlled pressure generating unit 34 from the secondary braking unit 24. More specifically, when closed, the separation valves 48 separate the master cylinder 32 from the wheel cylinders 30. A master cylinder circuit is defined as the portions of the wheel cylinder circuits 10, 12 between the master cylinder 32 and the separation valve 48. A wheel cylinder circuit is defined as the portions of the wheel cylinder circuits 10, 12 between the separation valve 48 and the wheel cylinder 30.

The primary braking unit 22 shown in FIG. 1 includes four inlet valves 44 and four outlet valves 46, one of each valve 44, 46 associated with each of the wheel cylinders 30. Each inlet valve 44 is located between a respective wheel cylinder 30 and the fluid pressure suppliers. Each outlet valve 46 is located between the respective wheel cylinder 30 and the reservoir 26. The inlet valves 44 are normally open control valves and the outlet valves 46 are normally closed control valves. The inlet and outlet valves 44, 46 are selectively manipulated (opened and closed to varying degrees via feedback from sensors, including independent wheel speed sensors etc.) to control aspects of braking such as an anti-lock braking system (ABS), traction control, or an electronic stability program (ESP).

The secondary braking unit 24 includes a second electronically controlled pressure generating unit 50. The second pressure generating unit 50 includes a motor 52 operable to drive a plurality of pumps 54, 56. Each pump 54, 56 has an outlet side coupled to pressurize two of the wheel cylinders 30 (e.g., the first pump 54 pressurizes the front wheel cylinders 30 and the second pump 56 pressurizes the rear wheel cylinders 30). Alternatively, the first pump 54 may pressurize the front left wheel cylinder 30 and the rear right wheel cylinder 30 and the second pump 56 may pressurize the front right wheel cylinder 30 and the rear left wheel cylinder. Fluid for the pumps 54, 56 is drawn from the reservoir 26 through a high-pressure selector valve (HSV valve) 62 for each circuit 10, 12. If the pistons 32A, 32B of the master cylinder 32 block the fluid path between the reservoir 26 and the circuits 10, 12, the pumps 54, 56 draw fluid from the master cylinder 32. The driver may continue to move the brake pedal 28 because the pressure is dropping as fluid is pulled out of the master cylinder 32. Otherwise, the pressure within the master cylinder 32 will drop to the point that master cylinder seals (located around the pistons 32A, 32B; not shown) will deflect under a slight vacuum to allow fluid to flow past from the reservoir 26

An inlet valve 64 is located in parallel with each HSV valve 62 between the master cylinder 32 and the respective pump 54, 56. The inlet valves 64 are electronically controllable to maintain or modify a pressure differential across the inlet valves 64 by transitioning between a closed position and an open position, and are operable to maintain a plurality of open positions therebetween. When in an open position, each inlet valve 64 provides a fluid path from the master cylinder 32 to a switch-over valve 58.

The switch-over valves 58 are located within the secondary braking unit 24 and are biased open but are closeable to block a fluid path from the master cylinder 32 to the wheel cylinders 30. An outlet side of the switch-over valve 58 provides a fluid path to the wheel cylinders 30 (returning through the primary braking unit 22). FIG. 1 illustrates that the outlet of only two of the switch-over valves 58 connect directly back to the primary braking unit 22. Alternatively, the outlets of all four switch-over valves 58 may be in communication with the two return or inlet ports 70 of the primary braking unit 22. The outlet side of all or some of the switch-over valves 58 further provides a fluid path to an accumulator 60 via outlet valves 66. The switch-over valves 58 may function similar to the separation valves 48 to disconnect the master cylinder 32 from the wheel cylinders 30 when closed. Therefore, the master cylinder circuit may otherwise be defined between the master cylinder 32 and the switch-over valve 58 and the wheel cylinder circuit may be defined between the switch-over valve 58 and the wheel cylinders 30.

The outlet valves 66 are positioned downstream of the switch-over valves 58 and are controllable between an open position and a closed position, and are operable to maintain a plurality of open positions therebetween. Further, the outlet valves 66 are electronically controllable to pulse between the open and closed positions to move fluid from the master cylinder 32, through the inlet and switch-over valves 64, 58 to the respective accumulator 60. Each pair of outlet valves 66 (i.e., associated with the two circuit 10, 12) is positioned upstream of the respective accumulator 60 with reference to a filling direction in which the accumulators 60 are being filled.

Each accumulator 60 is associated with one of the first and second braking circuits 10, 12. Each accumulator 60 is configured to selectively receive fluid from the master cylinder 32 when the inlet valve 64, switch-over valve 58, and outlet valve 66 are in open positions to direct fluid from the master cylinder 32 to the accumulator 60. Each accumulator 60 is provided with a bleed path to the inlet side of the respective pump 54, 56 via the check valve 68. Each accumulator 60 is further configured to store the fluid until electrically controlled to release or return the fluid.

The braking system 20 further includes a controller 80. The controller 80 is programmed to receive signals from various sensors of the braking system 20. These sensors may include, for example, pressure sensors within the first and/or second circuits 10, 12 and pedal input sensors (e.g., pedal travel sensor, pedal pressure/force sensor, wheel speed sensors, etc.) operable to measure an input to the brake pedal 28. The controller 80 is further operable to provide electrical signals to various components of the braking system 20 to actuate, for example, the motor 38 of the first electronically controlled pressure generating unit 34, the motor 52 of the second electronically controlled pressure generating unit 50, and the various valves 34A, 40, 44, 46, 48, 58, 62, 64, 66.

The braking system 20 is operable in two modes: a standard brake-by-wire mode and a back-up mode. In the standard brake-by-wire mode, a user provides an input to the brake pedal 28, displacing the master cylinder pistons 32A, 32B, and thereby displacing fluid from the master cylinder 32. In response to signals from a sensor (e.g., the pressure sensor, the pedal input sensor, etc.), the motor 38 of the electronically controlled pressure generating unit 34 is actuated to exert a drive force on the plunger 36, thereby pressurizing brake fluid to provide a braking force at the wheel cylinders 30. The switch-over valves 58 (and/or the separation valves 48) are closed, thereby prohibiting fluid from the master cylinder 32 from directly influencing the wheel cylinders 30. The simulator valve 40 is open such that the pedal feel simulator 42 is in communication with the master cylinder 32 to provide feedback to the brake pedal 28 and to the operator. The feedback corresponds to the input provided by the user at the brake pedal 28.

The braking system 20 is operable in an ABS (anti-lock braking) scenario and a non-ABS braking scenario within the standard brake-by-wire mode. The ABS scenario occurs upon loss of traction at one or more of the vehicle wheels, and anti-lock braking is needed. If anti-lock braking is needed, the ABS scenario is utilized such that the inlet and outlet valves 44, 46 are manipulated or modulated via the controller 80 to introduce pressure pulsations at the wheel cylinders 30 to maintain braking a the traction threshold. More specifically, the controller 80 pulses the inlet and outlet valves 44, 46 to cyclically release and reapply braking pressure at the wheel cylinder 30, thereby producing pressure pulsations in the wheel cylinder circuit (i.e., decoupled from the master cylinder circuit). In the non-ABS braking scenario, the inlet valves 44 are in the normally-open positions and the outlet valves 46 are in the normally-closed positions such that fluid pressure generated by the pressure generating unit 34 merely actuates the wheel cylinders 30, as discussed above.

The back-up mode is utilized when the operator provides an input to the brake pedal 28 and the first electronically controlled pressure generating unit 34 is incapable of providing a corresponding volume of fluid to the wheel cylinders 30. Such a scenario may occur, for example, if a sensor provides a signal outside of a predetermined range, or if the motor 38 is incapable of activating the plunger 36. Alternatively, the back-up mode may be utilized when there is no operator input (e.g., in automated braking, collision avoidance, etc.). The back-up mode may be a first back-up mode using hydraulic boost compensation, or a second "push-through" back-up mode.

In the first back-up mode, the master cylinder pistons 32A, 32B are displaced, thereby displacing fluid from the master cylinder 32. In response to signals from a sensor (e.g., the pressure sensor, the pedal input sensor, etc.), the HSV valves 62 are opened to move fluid from the master cylinder 32 to the inlet side of the pumps 54, 56. The controller further actuates the motor 50 to run the pumps, moving the fluid through open switch-over valves 58, separation valves 48, and inlet valves 44, to the wheel cylinders 30. The control valves 34A are in the unactuated (i.e., biased) closed position as the first electronically controlled pressure generating unit 34 is not in use. The simulator valve 40 is closed to prevent fluid from reaching the pedal feel simulator 42. Similar to the standard brake-by-wire mode, the first back-up input mode is operable in an ABS scenario (where the inlet and outlet valves 44, 46 are manipulated) and a non-ABS scenario.

In the event that the second electronically controlled pressure generating unit 50 is incapable of providing an adequate braking force to the wheel cylinders 30, the controller 80 may open the inlet valves 64 to establish a fluid path directly from the master cylinder 32 to provide a braking force at the wheel cylinders 30 through the switch-over valves 58 and separation valves 48 in the push-through back-up mode.

In non-brake-by-wire braking systems, the master cylinder is in communication with the wheel cylinders, such that anti-lock braking provides a familiar pulsing feedback at the brake pedal. However, brake-by-wire braking units necessarily decouple the wheel cylinders from the master cylinder in brake-by-wire braking. Therefore, anti-lock braking of a conventional brake-by-wire braking unit is not capable of providing the familiar pulsing feedback force to the brake pedal.

Figure 2:
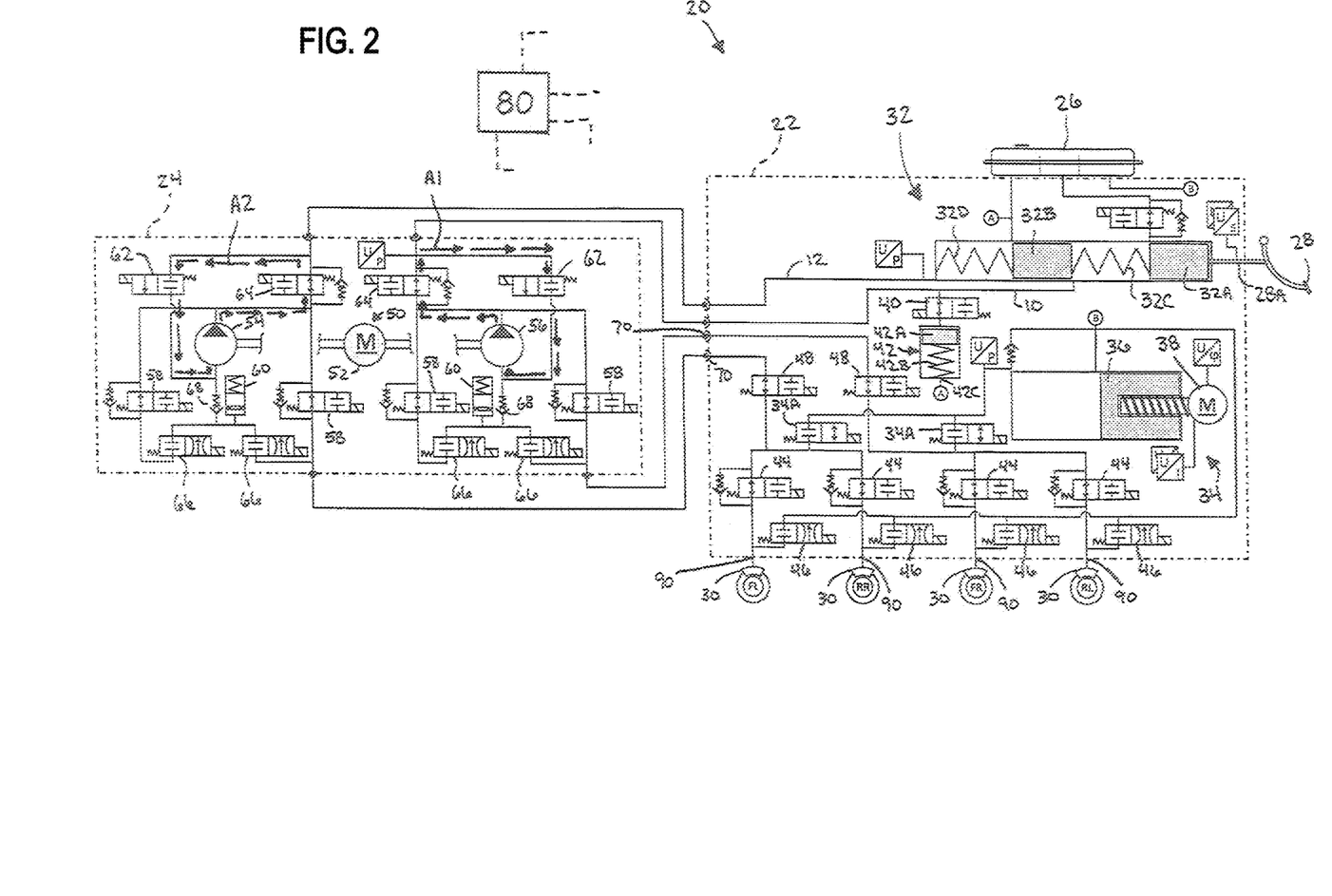
FIG. 2 is a schematic view of the vehicle braking system of FIG. 1, illustrating a fluid path in an ABS scenario of a brake-by-wire braking mode.

FIG. 2 illustrates how the braking system 20 provides feedback to the brake pedal 28 in the ABS scenario within the brake-by-wire braking mode. When the controller 80 determines that the applied braking force exceeds the traction limit, leading to momentary skidding or wheel lock-up based on sensor output (e.g., comparing wheel speed sensor output), the inlet and outlet valves 44, 46 are manipulated (e.g., pulsed open and closed) to limit or reduce the braking force applied by the pressure generating unit 34 to the wheel cylinders 30 to avoid sustained wheel lock-up. The separation valves 48 and/or the switch-over valves 58 are closed to prevent the ABS fluid pressure pulsations at the wheel cylinders 30 from being conveyed to the master cylinder 32.

When the inlet and outlet valves 44, 46 are actuated in the ABS scenario, the second electrically actuated pressure generating unit 50 is actuated to provide a feedback force at the brake pedal 28 indicative of the anti-lock braking scenario. As illustrated in FIG. 2, with fluid separation between the second pressure generating unit 50 and the wheel cylinders 30, actuation of the second pressure generating unit 50 does not modify or affect the fluid pressure at the wheel cylinders 30. More specifically, with the inlet valves 64 and HSV valves 62 in open positions, the pumps 54, 56 are driven by the motor 52 to move fluid from an inlet side of the pump 54, 56, through the respective inlet valve 64, through the respective HSV valve 62 and back to the inlet side of the pump 54, 56. The respective pump 56, 54, inlet valve 64, and HSV valve 62 define a circuit, illustrated by arrows A1, A2, through which the fluid cycles in the ABS scenario. The first circuit (illustrated by arrows A1) corresponds to the first braking circuit 10 and the second circuit (illustrated by arrows A2) corresponds to the second braking circuit 12.

Each circuit A1, A2, is in fluid communication with the respective master cylinder chamber 32C, 32D but does not provide an increased fluid flow to the master cylinder 32. Each circuit A1, A2 is self-contained such that the HSV valve 62 is open to accept the same fluid volume that is sent by the pump 54, 56 through the inlet valve 64. Therefore, the only effect at the master cylinder 32 (and the brake pedal 28) is an enhanced feel provided by a pulsation or pulsing force based on individual pumping cycles during operation of the pump 54, 56. Therefore, the pumps 54, 56 can provide a pulsation feedback at the brake pedal 28, even though the brake pedal 28 is disconnected from the pulsation occurring at the wheel cylinders 30.

The pulsation provided by the pumps 54, 56 at the brake pedal 28 can be modified by the controller 80 in one or both of magnitude and frequency by adjusting the speed of the pumps 54, 56 and/or valve manipulation of one or more of the inlet valves 64, HSV valves 62, switch-over valves 58, and outlet valves 66 Therefore, while the pulsation response provided by the pumps 54, 56 can be controlled by the controller 80 to mimic or match the frequency and magnitude of the pulsation provided at the wheel cylinders 30, this is not required in all constructions. The pumps 54, 56 can instead emulate the pulsation at the wheel cylinder 30 by providing a pulsation of any magnitude within a range of magnitudes discernible to the driver and any frequency within a range of frequencies discernible to the driver. When emulating the pulsation at the wheel cylinders 30, the pulsation at the brake pedal 28 merely corresponds to the timing (i.e., the instance at which the pulsation is occurring, the activation of the ABS scenario) of the pulsation at the wheel cylinders 30, regardless of the magnitude or frequency of the pulsation at the wheel cylinders 30.

Figure 3:
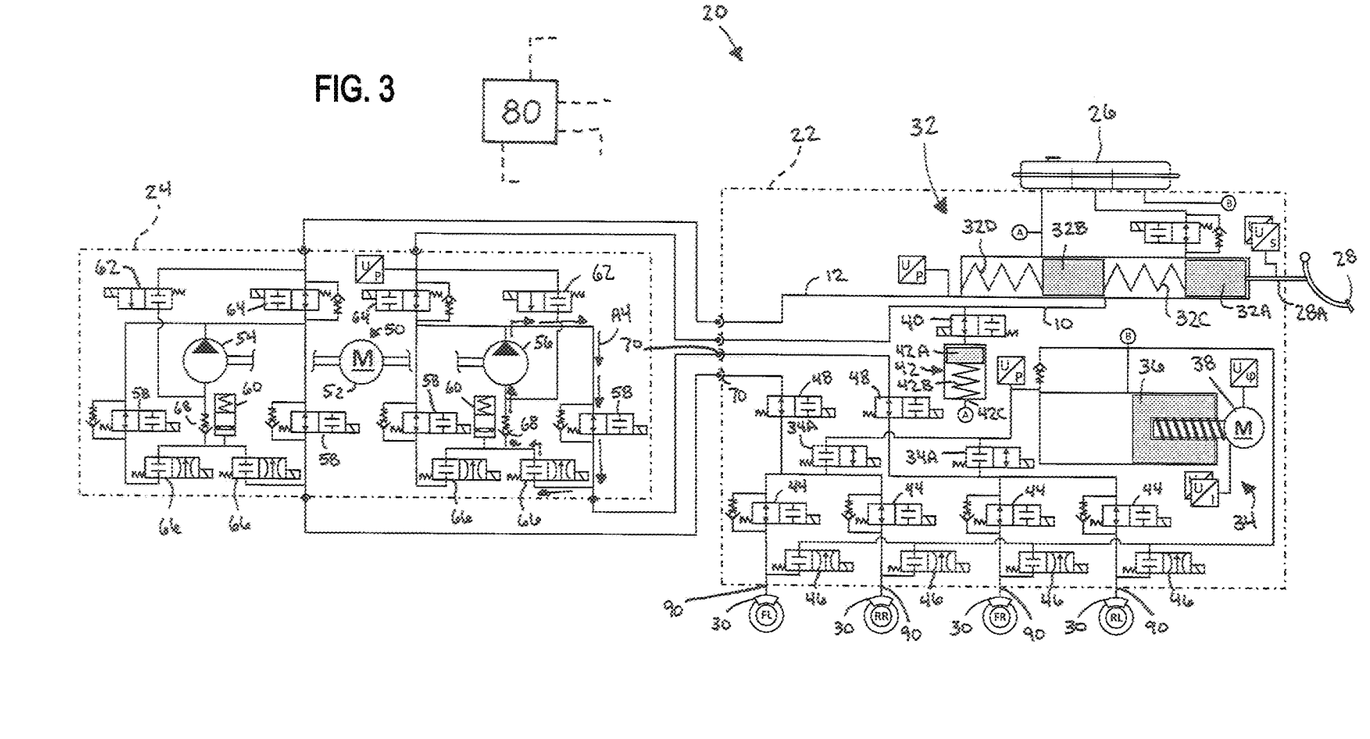
FIG. 3 is a schematic view of the vehicle braking system of FIG. 1, illustrating another fluid path in an ABS scenario of a brake-by-wire braking mode.

Alternatively, as shown in FIG. 3, one of the outlet valves 66 may be opened (i.e., per pump 54, 56) to define a circuit from the outlet side of the respective pump 54, 56, through the switch-over valve 58, the outlet valve 66, the check valve 68, and to the inlet side of the respective pump 54, 56. Such a circuit (shown schematically with arrows A4 with respect to pump 56) provides the ability to temporarily displace fluid into the accumulators 60, thereby allowing the pedal to rise and fall (i.e., similar to the pumping feeling felt in traditional ABS braking) in addition to the high pressure pulsation.

Figure 4:
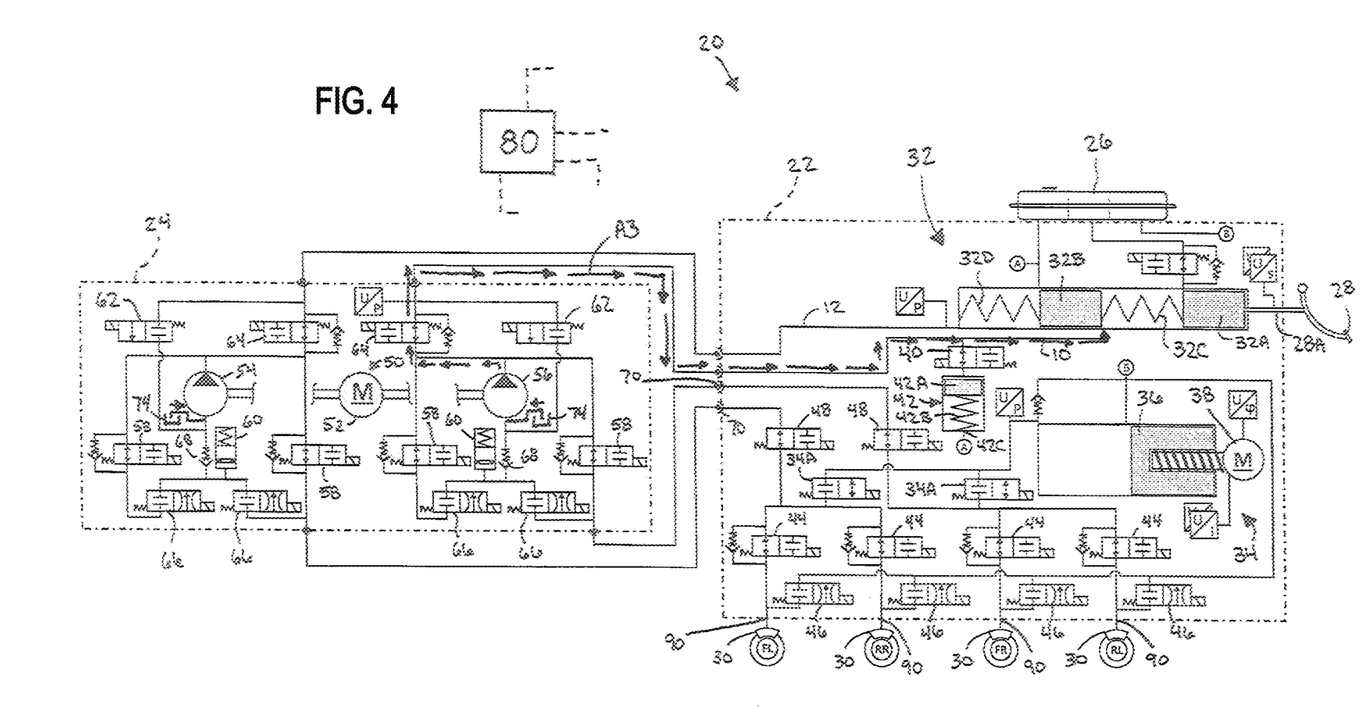
FIG. 4 is a schematic view of a vehicle braking system including a primary braking unit and a secondary braking unit, the secondary braking unit having a separate reservoir, and illustrating a fluid path in an ABS scenario of a brake-by-wire braking mode.

If, as shown in FIG. 4, the second pressure generating unit 50 is provided with a reservoir 74 separate from the master cylinder reservoir 26, the secondary braking unit 24 may function differently than that of FIG. 2 in providing the pulsation at the brake pedal 28. With the reservoir 74 or reservoirs (e.g., one per circuit 10, 12), the pumps 54, 56 have a fluid source from which to draw fluid (the master cylinder reservoir 26 is cut off from the inlets of the pumps 54, 56 when the brake pedal 28 is applied). Therefore, the pumps 54, 56 do not need to cycle fluid around the circuits A1, A2 (FIG. 2), but instead are able to provide the fluid directly to the master cylinder chambers 32C, 32D by pulsing the inlet valves 64. More specifically, (and with reference to the first circuit 10), the pump 56 draws fluid from the reservoir 74, building pressure against the inlet valve 64. The inlet valve 64 is opened for a short duration, permitting the pressure differential across the inlet valve 64 to generate a pulsation at the brake pedal 28, as illustrated by arrows A3. For clarity, arrows A3 are only illustrated with respect to the first circuit 10, though pressure generation may likewise occur in the second circuit 12. The other pump 54 (associated with the second circuit 12) may be simultaneously actuated or may be unused. If the other pump 54 is actuated, it may generate a pulsation that is out-of-phase from the pulsation provided, thereby modifying the frequency of the pulsation felt at the brake pedal 28. Alternatively, the pulsation may be in-phase with the pulsation provided by the pump 56, thereby modifying the magnitude of the pulsation felt at the brake pedal 28. The fluid provided from the pumps 54, 56 through the inlet valves 64 may bleed off to the master cylinder reservoir 26 between pulses from the inlet valves 64 to generate the pressure reduction that defines the pulsation. Alternatively, the HSV valves 62 may be opened opposite the inlet valves 64 to provide a drain path back to the reservoir 74.

The pumps 54, 56 are actuated to provide the ABS feedback force in the ABS scenario of the primary brake-by-wire braking mode. In normal non-ABS scenarios of the primary brake-by-wire braking mode, the pumps 54, 56 are unused and do not provide feedback to the brake pedal 28. Therefore, the pumps 54, 56 are only operable in two modes: in a backup secondary mode to provide fluid pressure to the wheel cylinders, and in an ABS scenario of the primary brake-by-wire braking mode to provide a feedback force at the brake pedal 28 indicative of the ABS scenario.

Various features of the disclosure are set forth in the following claims.

What is claimed is:

1. A vehicle braking system comprising:
   a wheel cylinder;
   a brake pedal;
   a master cylinder configured to receive an input from the brake pedal;
   a master cylinder circuit connected to the master cylinder;
   a primary braking unit including a first electrically-actuated pressure generating unit distinct from the master cylinder and operable to generate a braking force at the wheel cylinder in a primary mode of operation, decoupled from the master cylinder circuit;
   a secondary braking unit including a second electrically-actuated pressure generating unit distinct from the master cylinder and operable to generate a braking force at the wheel cylinder in a secondary mode of operation;
   a plurality of valves configured to transition between open and closed positions to provide anti-lock braking at the wheel cylinder upon loss of traction during braking in the primary mode of operation; and
   a controller programmed to actuate the plurality of valves and further programmed to actuate the second electrically-actuated pressure generating unit upon loss of traction in the primary mode of operation to generate pulsations within the master cylinder circuit to provide a feedback force at the brake pedal indicative of the anti-lock braking.

2. The vehicle braking system of claim 1, wherein the plurality of valves are configured to transition between open and closed positions to provide anti-lock braking at the wheel cylinder upon loss of traction in the primary mode of operation and the secondary mode of operation.

3. The vehicle braking system of claim 1, wherein the feedback force is a pulsation such that the second electrically-actuated pressure generating unit is operable to provide a pulsation at the brake pedal.

4. The vehicle braking system of claim 3, wherein the plurality of valves are operable by the controller to generate a pulsation at the wheel cylinder upon the controller detecting loss of traction in the first mode of operation, and wherein the magnitude and frequency of the pulsation at the brake pedal is independent of the magnitude and the frequency of the pulsation at the wheel cylinder.

5. The vehicle braking system of claim 4, further comprising a wheel cylinder circuit connected to the wheel cylinder, and a separation valve between the wheel cylinder circuit and the master cylinder circuit, wherein, upon the controller detecting loss of traction in the first mode of operation, the controller is programmed to close the separation valve such that the pulsation at the wheel cylinder does not affect the pulsation at the brake pedal.

6. The vehicle braking system of claim 1, wherein the second electrically-actuated pressure generating unit includes a pump, wherein, upon the controller detecting loss of traction in the primary mode of operation, the controller is programmed to operate the pump to provide pressure pulsations at the master cylinder, thereby generating the feedback force.

7. The vehicle braking system of claim 6, further comprising an inlet valve of the secondary braking unit located between an outlet side of the pump and the master cylinder, wherein, upon the controller detecting loss of traction in the primary mode of operation, the controller is programmed to open the inlet valve.

8. The vehicle braking system of claim 7, wherein, in the secondary mode of operation, the inlet valve is in a closed position.

9. The vehicle braking system of claim 6, further comprising an inlet valve of the secondary braking unit located between an outlet side of the pump and the master cylinder, wherein, upon the controller detecting loss of traction in the primary mode of operation, the controller is programmed to pulse the inlet valve between an open position and a closed position.

10. A method of operating a vehicle braking system, the method comprising:
   electrically actuating a brake-by-wire braking unit to generate a braking force at a wheel cylinder;
   modulating a valve with a controller to introduce pressure pulsations into the braking force at the wheel cylinder, defining an anti-lock braking force; and
   electrically actuating a secondary braking unit, separate from the brake-by-wire braking unit, to generate a feedback force at a brake pedal while a master cylinder is decoupled from the wheel cylinder, the feedback force separate from the anti-lock braking force and provided in response to the introduction of pressure pulsations at the wheel cylinder.

11. The method of claim 10, wherein the secondary braking unit includes a pump, and wherein actuating the secondary braking unit includes electrically actuating a pump to cycle fluid between an outlet of the pump and an inlet of the pump.

12. The method of claim 11, further comprising a first valve and a second valve in parallel with the first valve between a master cylinder and the pump, wherein the first and second valves are open when electrically actuating the secondary braking unit to generate the feedback force at the brake pedal.

13. The method of claim 10, wherein electrically actuating the secondary braking unit to generate the feedback force at the brake pedal includes producing a pedal pulsation via the feedback force.

14. The method of claim 10, wherein a separation valve located between the secondary braking unit and the primary braking unit is closed prior to electrically actuating the secondary braking unit to generate the feedback force such that the fluid used to generate the feedback force is separated from the fluid used to generate the anti-lock braking force at the wheel cylinder.

15. The method of claim 10, wherein the feedback force is a first feedback force at the brake pedal and generates a pulsation, the method further comprising actuating a pedal feel simulator to provide a second feedback force at the brake pedal, the second feedback force dependent upon a fixed spring constant of the pedal feel simulator.

16. A vehicle braking system comprising:
   a wheel cylinder;
   a brake pedal configured to receive a user input;
   a master cylinder configured to receive an input from the brake pedal; and
   a motor-driven pump operable to selectively provide fluid pressure to generate a feedback force to the brake pedal in a first braking mode in which the motor-driven pump is decoupled from the wheel cylinder,
   wherein the motor-driven pump is operable to generate a braking force at the wheel cylinder in a second braking mode.

17. The vehicle braking system of claim 16, wherein, in the first braking mode, a brake-by-wire braking unit separate from the motor-driven pump and the master cylinder is configured to generate a braking force at the wheel cylinder.

18. The vehicle braking system of claim 17, wherein the brake-by-wire braking unit includes at least one valve operable to be manipulated to generate an anti-lock braking pulsation at the wheel cylinder in the first braking mode, wherein, in the first braking mode, the motor-driven pump is operable to provide the anti-lock braking pulsation at the brake pedal in conjunction with manipulation of the valve.

19. The vehicle braking system of claim 16, wherein the first mode includes an ABS scenario and a non-ABS scenario, wherein the motor-driven pump is operable to provide the pulsation in the ABS scenario and is not operable to provide the pulsation in the non-ABS scenario.

20. The vehicle braking system of claim 16, further comprising a pedal feel simulator operable to provide a feedback force to the brake pedal according to a fixed spring constant in the first braking mode.

* * * * *